United States Patent Office 3,822,264
Patented July 2, 1974

3,822,264
CERTAIN 2,4-DIAMINO-5-BENZYL-6-ALKYLTHIOPYRIMIDINES
Barbara Roth, Chapel Hill, N.C., assignor to Burroughs Wellcome Co., Research Triangle Park, N.C.
No Drawing. Filed Apr. 12, 1972, Ser. No. 243,400
Claims priority, application Great Britain, Apr. 16, 1971, 9,640/71
Int. Cl. C07d 51/40
U.S. Cl. 260—256.5 R                    39 Claims

ABSTRACT OF THE DISCLOSURE

This invention is directed to 2,4-diamino-5-benzylpyrimidine compounds having a 6-alkyl thio group and to methods of converting this compound to 2,4-diamino-5-benzylpyrimidine compounds having useful antibacterial and other useful properties as intermediates.

---

This invention relates to the preparation of 2,4-diamino-5-benzylpyrimidines and to the 2,4-diamino-5-benzylpyrimidines so prepared.

A number of methods for the preparation of 2,4-diamino-5-benzylpyrimidines are known. The majority of these methods have required the utilization as starting materials of a benzaldehyde or a benzoate.

However, the process described and claimed in United Kingdom Patent Specification No. 1,128,234 relates to the utilization of phenol or a phenol derivative as the starting material. The phenol derivative is converted to a Mannich base by reaction with formaldehyde and a secondary amine. This Mannich base is reacted with a 2,4-disubstituted pyrimidine, for example, 2,4-diaminopyrimidine, to form the corresponding 2,4-disubstituted-5-(4-hydroxybenzyl)pyrimidine which may be, if desired, reacted with a compound of formula $R^3Q$, wherein $R^3$ is a saturated or unsaturated hydrocarbon radical which is optionally substituted, for example, by a chlorine atom, and wherein Q is a reactive atom or group, to form a 4'-$OR^3$ derivative.

It has now been discovered that the reaction between the Mannich base and 2,4-diaminopyrimidine can be effected in improved yields if the 2,4-diaminopyrimidine is substituted in the 6-position by an alkylthio group.

It has also unexpectedly been found that the resulting 2,4-diamino-5-(4'-hydroxybenzyl) - 6 - alkylthio-pyrimidines can be reacted with the compound $R^3Q$ to form the corresponding 4'-derivative in significantly improved yields compared with the 2,4-diamino-5-(4'-hydroxybenzyl)pyrimidines having no 6-alkylthio substituent.

The 6-alkylthio group can be readily removed from the 4'-derivatives by hydrogenolysis.

Moreover, the Mannich base starting materials are very easily obtained from compounds commercially available at economic prices.

According to the present invention there is provided a method of preparing 2,4-diamino-5-benzylpyrimidines of general formula:

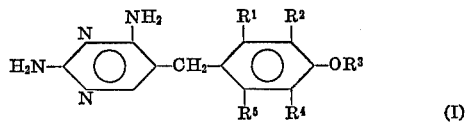

(I)

wherein $R^1$, $R^2$, $R^4$ and $R^5$ are the same or different and each is a hydrogen atom, a halogen atom, an alkyl group or an alkoxy group, the alkoxy and alkyl groups each containing from 1 to 12 carbon atoms, preferably from 1 to 7 carbon atoms, most preferably from 1 to 4 carbon atoms, and wherein $R^3$ is a saturated or unsaturated hydrocarbon radical containing up to 12 carbon atoms which is, optionally, substituted by a halogen atom, for example, chlorine, which comprises reducing, by hydrogenolysis of the $SR^6$ group, a compound of formula:

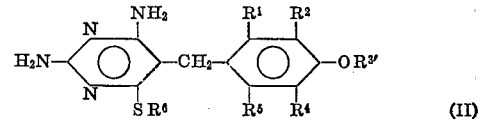

(II)

wherein $R^{3'}$ is $R^3$ or a hydrogen atom and wherein $R^{3'}$ is an alkyl group having from 1 to 12 carbon atoms, preferably from 1 to 7 carbon atoms, most preferably from 1 to 4 carbon atoms or an aralkyl group such as benzyl and, in the case where $R^{3'}$ is hydrogen, reacting the hydroxyl group of the dethiated pyrimidine with a compound of formula $R^3Q$ where Q is a reactive atom or group which may be a halogen atom, for example, iodine, or a sulphate or sulphonate group, for example, a p-toluene sulphonate.

The reaction of the hydroxyl group with $R^3Q$ can be accomplished in the presence of an acid binding agent, for example, a base strong enough to form the phenoxide anion.

The dethiation is suitably carried out using a large excess, for example, from 6 to 30 times by weight of compound (II) of Raney nickel. The hydrogenolysis can also be carried out using Raney cobalt or by catalytic hydrogenation utilizing hydrogen in the presence of a catalyst such as palladium on charcoal. The cleavage is normally effected in a polar solvent such as an alkanol containing from 1 to 4 carbon atoms at an elevated temperature.

Compounds of formula (I) possess both antimalarial and antibacterial activities (J. Am. Chem. Soc., 1951, 73, 3758). 2,4 - Diamino-5-(3,4,5-trimethoxybenzyl)pyrimidine, known as trimethoprim (U.S. Pat. 2,909,522), has a broad antibacterial spectrum which includes many of the Gram-positive species but it is also active against species of the genus Proteus. In common with other 2,4-diaminopyrimidines it is a competitor of folic and folinic acids in microorganisms which require these nutrilites, and it can be shown to inhibit dihydrofolate reductase in Streptococcus faecalis. A strong potentiative effect is observed when the drug is administered in combination with sulphonamides as a consequence of the sequential blockade of the biochemical pathway which leads to the de novo synthesis of coenzymes F. This potentiation may be demonstrated both in vitro and in experimental infections in mice with Staphylococcus and Proteus species. 2,4-Diamino-5-benzylpyrimidines, which include trimethoprim and 2,4 - diamino-5-(3,4-dimethoxybenzyl)pyrimidine, known as diaveridine (U.S. Pat. 2,658,897), may be administered orally at a dose of 1 mg./kg. to 30 mg./kg. per day. Preferably these compounds are administered in tablet form to a mammal being treated, and trimethoprim may advantageously be combined with sulphamethoxazole against certain respiratory infections. A further example of this class is 2,4-diamino-5-(2-methyl-4,5-dimethoxybenzyl)pyrimidine (ormetoprim), which has been reported to show antibacterial activity, and also has coccidiostatic properties when combined with sulphadimethoxine.

The compounds of formula (II) where $R^{3'}$ is $R^3$ can be prepared by reacting a compound of formula:

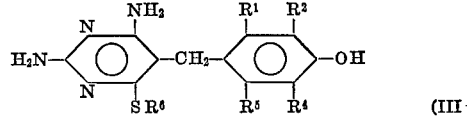

(III)

wherein $R^1$, $R^2$, $R^4$, $R^5$ and $R^6$ are as previously defined with a compound $R^3Q$ where Q and $R^3$ are as defined above. The reaction is normally carried out in the presence of an acid binding agent such as a base strong enough to form the phenoxide anion.

R³ is preferably a saturated or unsaturated hydrocarbon radical containing not more than 4 carbon atoms, most preferably a methyl group.

When R³ is an alkyl group the reaction of R³Q with a compound of formula (III) is, of course, an alkylation which can be carried out utilizing conventional techniques known to those skilled in the art. For example, a compound of formula (III) may be reacted with an alkyl halide, sulphate or sulphonate, under basic conditions in a polar solvent such as dimethyl sulphoxide or an alkanol. The alkylation may be carried out at room temperature but, if a higher reaction rate is desired, elevated temperatures may be utilized. Basic conditions can be achieved by the use of a molar equivalent or a slight molar excess of a base such as potassium hydroxide or a sodium alkoxide.

Compounds of formula (III) can advantageously be prepared by reacting a substituted pyrimidine of general formula:

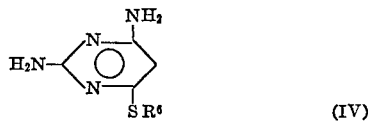

(IV)

wherein R⁶ is as defined above, with a Mannich base of general formula:

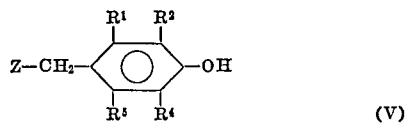

(V)

wherein R¹, R², R⁴, and R⁵ are as defined above and wherein Z is a secondary amino group.

Z is preferably either a dialkylamino group of formula NR⁷R⁸ wherein R⁷ and R⁸ represent identical or different alkyl groups or a cyclic amino group having, for example, up to 10 carbon atoms, for example, a pyrrolidino, piperidino, morpholino, or N-methylpiperazine group.

A preferred sub-class of Mannich bases (V) is that in which R¹, R², R⁴, and R⁵ are not all the same. Most preferably R¹ and R⁵ are hydrogen atoms, and R² and R⁴ are alkyl, alkoxy or halogen, but not necessarily the same. Especially preferred examples are where R² and/or R⁴ are methyl, ethyl, ethoxy, methoxy, or bromo.

The reaction of the Mannich base (V) with the pyrimidine of formula (IV) may be carried out in a polar (protic or aprotic) solvent which preferably has a boiling point above 100° C. Suitable solvents include ethylene glycol, dimethyl sulphoxide, dimethyl formamide, water, pentanol, cyclohexanol and β-methoxyethanol.

The solvent should preferably be compatible with the reactants and should not react chemically with the reactants or products of the reaction. The reaction can be carried out at an elevated temperature in the range of from 100 to 200° C., preferably from 110 to 160° C.

An inert atmosphere such as nitrogen is normally used to minimize loss by oxidation of the reactants or product, especially the oxidation-susceptible phenolic Mannich base and its reaction product.

The use of a basic catalyst such as an alkoxide, for example, sodium methoxide, or an alkali metal hydroxide, for example, potassium hydroxide, to increase the rate of reaction has been found advantageous.

In one embodiment of the invention there is provided a method of preparing compounds of general formula (I) which comprises the steps of:

(a) reacting the Mannich base of formula (V) with the substituted pyrimidine of formula (IV) to form a compound of formula (III);

(b) reacting the compound of formula (III) with a compound of formula R³Q wherein R³ and Q are as previously defined, to form a compound of formula (II) wherein R³′ is R³; and then (c) removing by hydrogenolysis the alkylthio group SR⁶, wherein R⁶ is as previously defined, to form the desired compound of formula (I).

In the methods of the invention R² and R⁴ are conveniently alkyl groups or halogen atoms since the phenols, for example, 2,6-dimethylphenol or 2,6-dibromophenol, from which the corresponding Mannich bases of formula (IV) can be prepared by reaction with formaldehyde and a secondary amine, are commercially readily available. Moreover, the yields obtained in the above methods when R² and R⁴ are alkyl groups or halogen atoms are particularly good.

Another favoured embodiment of the present invention resides in the utilization of compounds in which at least one of R² and R⁴ is an alkoxy group, e.g. methoxy or ethoxy, since such methods embrace the preparation of the particularly valuable antibacterials and potentiators: 2,4-diamino-5-(3,4,5-trimethoxybenzyl)pyrimidine and its 3,4,5 - triethoxy homologue; 2,4-diamino-5-(3′,4′-dimethoxybenzyl)pyrimidine and 2,4-diamino-5-(2-methyl-3,4-dimethoxybenzyl)pyrimidine.

According to another aspect of the invention there are provided the novel classes of intermediates of formulae (II) and (III).

The following Examples illustrate the invention:

EXAMPLE 1

2,6 - Diethyl-4-(N,N-dimethylaminomethyl)phenone is prepared by reacting 2,6-diethylphenol (itself prepared by hydrolyzing the diazonium salt of 2,6-diethylaniline) with formaldehyde and dimethylamine.

To a stirred solution of sodium methoxide (0.64 g.) in ethylene glycol (225 ml.) was added 2,6-diethyl-4-(N,N-dimethylaminomethyl)phenol (24.5 g.) and 2,4-diamino-6-methylthiopyrimidine (19.5 g.). The reaction mixture was heated at 140–150° C. for 3 hours, cooled, and added to water. A yellow gum separated. This was dissolved in acetone, acidified with hydrochloric acid, and heated on a steam bath. A solid separated, which was extracted with ethyl acetate and ether, followed by recrystallization from acetone/methanol, with the aid of charcoal. The product, 2,4 - diamino-5-(3′,5′-diethyl-4′-hydroxybenzyl)-6-methylthiopyrimidine hydrochloride, m.p. 210–212° C. (dec.), was obtained in a 60% yield.

A solution of this pyrimidine (3.0 g.) and sodium methylate (0.91 g.) in dimethyl sulfoxide (32 ml.) was cooled in an ice bath and methyl iodide (0.58 ml.) added. The mixture was stoppered and maintained at room temperature for 24 hours, after which the solvent was removed. The gum was extracted with sodium hydroxide to remove any phenolic material, and then dissolved in ethanol and converted to a hydrochloride salt by the addition of hydrochloric acid. The resultant solid was recrystallized from ethanol, which produced 2,4-diamino-5-(3,5-diethyl-4-methoxybenzyl) - 6 - methylthiopyrimidine hydrochloride (1.5 g.), melting at 215–218° C.

A 1.0 g. portion of this product in 75 ml. of ethanol was heated under reflux, and 7.5 g. of freshly activated Raney nickel added over a 2.5 hour period. Stirring and heating was continued for an additional 9 hours, after which the Raney nickel was filtered off and washed with ethanol. The solution was evaporated to dryness and recrystallized from ethanol-ether, with the aid of charcoal, thus producing 2,4-diamino-5-(3,5-diethyl-4-methoxybenzyl)pyrimidine (0.2 g.) as white platelets melting at 153–154° C., and having the correct elementary analysis. UV maxima were at 270 nm. (cation) and at 287 nm. (neutral species).

EXAMPLE 2

A reaction mixture comprising 2,4-diamino-6-methylthiopyrimidine (6.3 g.), N,N-dimethyl-3,5-dimethoxy-4-hydroxybenzylamine (9.9 g.), and sodium methoxide (2.4 g.) in ethylene glycol (60 ml.) was heated under nitrogen for 4 hours. After cooling to room temperature, it was neutralized with acetic acid. After evaporation of a portion of the ethylene glycol and then standing for several days, a solid (10.4 g.) had precipitated. An additional 0.8 g. of solid was obtained from the mother liquors by precipitation upon pouring into water. The crude yield was 11.4 g. (89% of theoretical).

To a solution of this crude product (6.3 g.) in dimethyl sulfoxide (25 ml.) was added a solution of sodium methoxide (1.05 g.) in dimethyl sulfoxide (10 ml.). Then methyl iodide (2.8 g.) was added, and the reaction mixture was allowed to stand at room temperature for 48 hours. The solvent was removed by evaporation under reduced pressure, and the residue extracted with a solution of dilute sodium hydroxide. The remaining solid was washed well with water and dried to give 6 g. (93% of theoretical) of 2,4-diamino-5-(3',4',5'-trimethoxybenzyl) - 6 - methylthiopyrimidine, m.p. 178–179° C. (recrystallized from ethyl acetate).

A mixture of the above product (1 g.), ethanol (30 ml.), ammonium hydroxide (1 ml.) and freshly activated Raney nickel (6 g.) was heated and stirred for 6 hours.

The hot reaction mixture was filtered and the filtrate evaporated to give a 54% yield of trimethoprim, 2,4-diamino-5-(3,4,5-trimethoxybenzyl)pyrimidine, m.p. 198–200° C. (from ethanol).

EXAMPLE 3

2,4-Diamino-5-(3,5-di-t-butyl-4-methoxybenzyl) pyrimidine

N,N - Dimethyl - 3,5-di-t-butyl-4-hydroxybenzylamine (5.06 g.) [Coffield et al., J. Am. Chem. Soc., 79, 5019 (1957)] was reacted with 2,4-diamino-6-methylthiopyrimidine (3.0 g.) by the method of Example 1 to produce 2,4 - diamino-5-(3,5-di-t-butyl-4-hydroxybenzyl)-6-methylthiopyrimidine, 5.3 g. (67%). The product was purified as the hydrochloride by recrystallization from ethanol; m.p. 218–221.5°.

This product was treated with methyl iodide as in Example 1 to produce 2,4-diamino-5-(3,5-di-t-butyl-4-methoxybenzyl) - 6 - methylthiopyrimidine hydrochloride, m.p. 215–216°, from ethanol-ethyl acetate. [Anal. Calcd. for $C_{21}H_{32}N_4OS \cdot HCl$: C, 59.33; H, 7.82; N, 13.18. Found: C, 59.70; H, 7.85; N, 13.14.]

The methylthio group was removed from the above pyrimidine by treatment with Raney nickel, as in Example 1. There was obtained 2,4-diamino-5-(3,5-di-t-butyl-4-methoxybenzyl)pyrimidine in 56% yield. The product, when purified as the hydrochloride by recrystallization from ethanol, melted at 272–275°. [Anal. Calcd. for $C_{20}H_{30}N_4O \cdot HCl$: C, 63.39; H, 8.25; N, 14.78. Found: C, 63.39; H, 8.35; N, 14.70.]

EXAMPLE 4

To a chilled solution of 2,4-diamino-6-mercaptopyrimidine (26.4 g.) in $N$ sodium hydroxide (185 ml.) was added ethyl bromide (20.3 g.) and sufficient ethanol to give a single phase. After standing at room temperature for 24 hours, the reaction mixture was filtered, the filtrate concentrated by evaporation and acidified to pH 5–6. This was chilled to give 2,4-diamino-6-ethylthiopyrimidine (20 g.), m.p. 152.5–153.5° C. after recrystallization from ethanol/methyl Cellosolve.

To a stirred solution of sodium methoxide (3.85 g.) in ethylene glycol (115 ml.) was added 2,4-diamino-6-ethylthiopyrimidine (11.0 g.) and N,N-dimethyl-3,5-dimethoxy-4-hydroxybenzylamine hydrochloride (16.0 g.). The reaction mixture was heated at 140–150° C. under nitrogen for 4.5 hours, neutralized with glacial acetic acid, and then cooled to 0° C. The precipitated product was removed by filtration, washed with water and ether and dried to give 2,4-diamino-5-(3,5-dimethoxy-4-hydroxybenzyl)-6-ethylthiopyrimidine (18 g.) which melted at 185.5–187.5° C. after recrystallization from ethanol.

A solution of 2,4-diamino-5-(3,5-dimethoxy-4-hydroxybenzyl)-6-ethylthiopyrimidine (6 g.) and sodium methoxide (0.97 g.) in dimethyl sulfoxide (75 ml.) was cooled, and methyl iodide (2.56 g.) was added. The reaction mixture was allowed to stand at room temperature for 5 days. The solvent was evaporated and the residue extracted with $N$ sodium hydroxide to give 2,4-diamino-5-(3,4,5-trimethoxybenzyl)-6-ethylthiopyrimidine (8 g.) which melted at 177–179° C. after recrystallization from ethanol.

A solution of 2,4-diamino-5-(3,4,5-trimethoxybenzyl)-6-ethylthiopyrimidine (1.5 g.) in ethanol (75 ml.) was heated with stirring under reflux while freshly activated Raney nickel (15 g.) was added over a 2 hour period. Reflux was continued for an additional 3 hours, the Raney nickel removed by filtration, and the solvent evaporated. The resulting 2,4 - diamino - 5 - (3,4,5-trimethoxybenzyl) pyrimidine (trimethoprim) was recrystallized from ethanol to give 325 mg., m.p. 199–201° C.

EXAMPLE 5

Following the procedure of Example 4 except that n-butyl bromide (25.5 g.) was used instead of ethyl bromide 2,4-diamino-6-n-butylthiopyrimidine was prepared. It was isolated as the hydrochloride (35 g.) by the addition of hydrochloric acid. After recrystallization from ehtanol/methyl Cellosolve the hydrochloride hydrate melted at 155–157° C.

Following the procedure of Example 4 the above pyrimidine hydrochloride (20 g.), N,N-dimethyl-3,5-dimethoxy-4-hydroxybenzylamine hydrochloride (21.2 g.) and sodium methoxide (10.3 g.) in dry ethylene glycol (210 ml.) gave 2,4 - diamino - 5 - (3,5 - dimethoxy-4-hydroxybenzyl)-6-n-butylthiopyrimidine (27 g.) which melted at 154–156° C. after recrystallization from methanol.

This material (6.5 g.) was methylated to give 2,4-diamino -5- (3',4',5'-trimethoxybenzyl)-6-n-butylthiopyrimidine by the procedure of Example 4 using methyl iodide (2.5 g.) and sodium methoxide (1.04 g.) in dimethyl sulfoxide (70 ml.). The yield was 2.0 g. of product which melted at 119.5–120.5° C. after recrystallization from ethanol.

This product (0.75 g.) was dethiated with Raney nickel (15 g.) in ethanol (20 ml.) to give trimethoprim (15 mg.), m.p. 199–201° C.

EXAMPLE 6

The procedure of Example 4 was followed, except that n-hexyl bromide (31.7 g.) was used instead of n-butyl bromide to yield 2,4-diamino-6-hexylthiopyrimidine (38 g.) which melted at 82–84° C. after recrystallization from ethanol/methyl Cellosolve.

Still following the procedure of Example 4, the above pyrimidine (14 g.), N,N - dimethyl-3-5-dimethoxy-4-hydroxybenzylamine hydrochloride (15.4 g.), and sodium methylate (3.7 g.) in 140 ml. of ethylene glycol were allowed to react to give 2,4-diamino-5-(3,5-dimethoxy-4-hydroxybenzyl) - 6-n - hexylthiopyrimidine (15 g.) which melted at 150–152° C., after recrystallization from methanol.

This material (6 g.) was methylated using methyl iodide (2.2 g.) and sodium methoxide (0.83 g.) in dimethyl sulfoxide (60 ml.), to give 2,4-diamino-5-(3,4,5-trimethoxybenzyl)-6-n-hexylthiopyrimidine (5.5 g.) which melted at 120-122° C. after recrystallization from ethanol.

Of this product 2.0 g. in 50 ml. of ethanol was allowed to react with Raney nickel (20 g.) to give trimethoprim (170 mg.), m.p. 198–200° C. after recrystallization from ethanol.

EXAMPLE 7

2,4-Diamino-5-(3,5-di-n-propyl-4-methoxybenzyl) pyrimidine 2,6 - Di-n-propylphenol [Claisen, Ann., 418, 921] is treated with formalin and dimethylamine in ethanol according to the procedure of Coffield et al. [J. Am. Chem.

Soc., 79, 5019 (1957)] for the isopropyl analog, to yield N,N-dimethyl-3,5-di-n-propyl-4-hydroxybenzylamine.

A mixture of 2,4-diamino-6-methylthiopyrimidine, an equivalent amount of N,N-dimethyl-3,5-di-n-propyl-4-hydroxybenzylamine, and 0.1 equivalent of sodium methylate is heated in ethylene glycol in an atmosphere of nitrogen at 150° C. for 3 hours. Most of the glycol is then removed under vacuum, and the residue is diluted with several volumes of water, followed by neutralization with acetic acid. There is thus obtained 2,4-diamino-5-(3,5 di - n-propyl-4-hydroxybenzyl)-6-methylthiopyrimidine, which may be purified by conversion to its hydrochloride and recrystallization from ethanol. The hydrochloride salt is dissolved in dimethyl sulfoxide, followed by the addition of 2 equivalents of sodium methylate to produce the sodium salt of the phenol. This is followed by the addition of 1 equivalent of methyl iodide. The solution is allowed to stand in a stoppered flask for 48 hours, after which the dimethyl sulfoxide is removed under vacuum. The residue is extracted with warm dilute sodium hydroxide to remove any phenolic material. The insoluble solid is isolated and washed well with water. This product, 2,4-diamino - 5 - (3,5 - di - n-propyl-4-methoxybenzyl)-6-methylthiopyrimidine, is then dissolved in hot ethanol and active Raney nickel (6–10 times the weight of the pyrimidine) added. The mixture is stirred and heated under reflux for several hours. The course of the dethiation is observed by the change in ultraviolet absorption spectrum, which is characterized by a loss in UV maximum at 307 nm. When the reaction is completed, the nickel is filtered off, and the ethanol concentrated to small volume and chilled. There is thus obtained 2,4-diamino-5-(3,5-di-n-propyl-4-methoxybenzyl)-pyrimidine. The product may be purified by conversion to its hydrochloride salt, followed by crystallization from ethanol ether, m.p. 263–267° C. (dec.).

EXAMPLE 8

2,4-Diamino-5-(3,5-diethyl-4-octyloxybenzyl) pyrimidine 2,4-Diamino - 5 - (3,5 - diethyl - 4 - hydroxybenzyl)-6-methylthiopyrimidine [see example 1] is alkylated with n-octyl bromide in dimethyl sulfoxide in a manner similar to example 1, except that the reaction mixture is heated on the steam bath overnight. There is thus obtained 2,4-diamino - 5 - (3,5-diethyl-4-octyloxybenzyl)-6-methylthiopyrimidine, which is dethiated with Raney nickel according to the procedure of Example 1 to produce 2,4-diamino-5-(3,5-diethyl-4-octyloxybenzyl)pyrimidine.

EXAMPLE 9

2,4-Diamino-5-(3,5-diisopropyl-4-methoxybenzyl) pyrimidine

A mixture of N,N-dimethyl-3,5-diisopropyl-4-hydroxybenzylamine (23.5 g.) [Coffield et al., J. Am. Chem. Soc., 79, 5019 (1957)], 2,4-diamino-6-methylthiopyrimidine (15.6 g.), sodium methoxide (0.60 g.) and ethylene glycol (125 ml.) was treated in a manner similar to that of Example 1 to produce 2,4-diamino-5-(3,5-diisopropyl-4-hydroxybenzyl)-6-methylthiopyrimidine; yield, 29 g. crude product (85%). The product was purified by conversion to the hydrochloride salt with ethanol plus hydrochloric acid, and then recrystallized from ethanol; UV maxima at pH 12 were at 296 and 211 nm; at pH 2 maxima were found at 302 and 200 nm. [Anal. Calcd. for $C_{18}H_{26}N_4OS \cdot HCl$: C, 56.45; H, 7.11; N, 14.63. Found: C, 56.25; H, 7.05; N, 14.57.]

The above product (25 g.) was treated with methyl iodide (10.6 g.) using the procedure of Example 1, which produced 2,4-diamino-5-(3,5-diisopropyl-4-methoxybenzyl)-6-methylthiopyrimidine hydrochloride (13 g.) melting at 280° C. (dec.). [Anal. Calcd. for $C_{19}H_{28}N_4OS \cdot HCl$: C, 57.48; H, 7.36; N, 14.11. Found: C, 57.70; H, 7.39; N, 14.19.]

Three grams of this product was dissolved in 50 ml. of hot ethanol and heated under reflux with approximately 30 g. of activated Raney nickel for 10 hours. The course of the reaction was followed by observing the change in UV maximum in acid from 307 to 272 nm. The nickel was then separated from the hot solution, and the filtrate concentrated to yield 1 g. (43%) of 2,4-diamino-5-(3,5-diisopropyl-4-methoxybenzyl)pyrimidine, which melted at 205–207° C. after recrystallization from ethanol. [Anal. Calcd. for $C_{18}H_{26}N_4O$: C, 68.76; H, 8.3; N, 17.82. Found: C, 68.76; H, 8.43; N, 17.67.]

EXAMPLE 10

2,4 - Diamino - 5 - (3,5-dimethoxy-4-hydroxybenzyl)-6-methylthiopyrimidine is dissolved in hot ethanol and treated with 10 times its weight of activated Raney nickel by heating under reflux for ten hours. The nickel is filtered from the hot solution, and the nickel cake is further extracted with hot methyl cellosolve and dimethylformamide. By cooling and concentrating the combined extracts there is obtained 2,4-diamino-5-(3,5-dimethoxy-4-hydroxybenzyl)pyrimidine, melting at 265–270° C. (dec.).

I claim:

1. A 2,4-diamino-5-benzylpyrimidine compound of the formula (II):

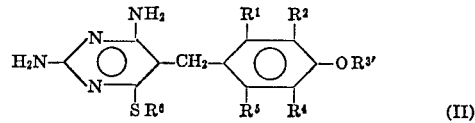

wherein $R^1$, $R^2$, $R^4$, and $R^5$ are the same or different and each is a hydrogen atom, a halogen atom, an alkyl group having 1 to 4 carbon atoms or an alkoxy group having 1 to 4 carbon atoms, wherein $R^{3'}$ is a hydrogen atom, or an alkyl group having 1 to 4 carbon atoms, or a benzyl group and $R^6$ is an alkyl group of 1 to 12 carbon atoms or a benzyl group.

2. A 2,4 - diamino - 5 - benzylpyrimidine of formula (II) according to claim 1, wherein $R^1$ represents a methyl group, $R^2$ and $R^5$ represent hydrogen atoms, $R^4$ represents a methoxy group and $R^{3'}$ represents a hydrogen atom or a methyl group.

3. A 2,4-diamino-5-benzylpyrimidine of formula (II) according to claim 1, wherein $R^1$ and $R^5$ represent hydrogen atoms.

4. A 2,4-diamino-5-benzylpyrimidine of formula (II) according to claim 3, wherein $R^2$ and $R^4$ represent methoxy groups and $R^{3'}$ represent a hydrogen atom or a methyl group.

5. A 2,4-diamino-5-benzylpyrimidine of formula (II) according to claim 3, wherein $R^2$ represents a hydrogen atom, $R^4$ represents a methoxy group, and $R^{3'}$ represents a hydrogen atom or a methyl group.

6. A 2,4-diamino-5-benzylpyrimidine of formula (II) according to claim 3, wherein $R^2$ and $R^4$ represent ethoxy groups, and $R^{3'}$ represent a hydrogen atom or an ethyl group.

7. A 2,4-diamino-5-benzylpyrimidine compound of formula II

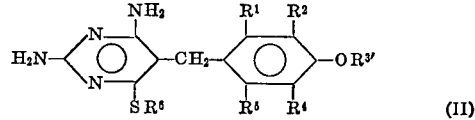

wherein one or two of $R^1$, $R^2$, $R^4$ and $R^5$ is alkyl or alkoxy of 1 to 4 carbon atoms, while the others are hydrogen, wherein $R^6$ is alkyl of 1 to 4 carbon atoms, and $R^{3'}$ is hydrogen or lower alkyl of 1 to 4 carbon atoms.

8. A 2,4-diamino-5-benzylpyrimidine according to claim 7 in which $R^3$ is hydrogen.

9. A 2,4-diamino-5-benzylpyrimidine according to claim 7 in which $R^{3'}$ is lower alkyl.

10. A 2,4-diamino-5-benzylpyrimidine according to claim 9 in which $R^{3'}$ is methyl.

11. A 2,4-diamino-5-benzylpyrimidine according to claim 10 in which $R^6$ is methyl.

12. A 2,4-diamino-5-benzylpyrimidine compound according to claim 4 in which $R^{3'}$ is methyl.

13. A 2,4-diamino-5-benzylpyrimidine compound according to claim 4 in which $R^{3'}$ is hydrogen.

14. A 2,4-diamino-5-benzylpyrimidine compound according to claim 12 in which $R^6$ is alkyl of 1 to 4 carbon atoms.

15. A 2,4-diamino-5-benzylpyrimidine compound according to claim 4 in which $R^6$ is alkyl of 1 to 4 carbon atoms.

16. A compound according to claim 7 in which $R^1$ and $R^5$ are hydrogen and $R^2$ and $R^4$ are methoxy groups, and $R^{3'}$ represents a hydrogen atom or a methyl group.

17. A compound according to claim 7 which is 2,4-diamino - 5 - (3',5' - dimethoxy - 4' - hydroxybenzyl)-6-methylthiopyrimidine.

18. A compound according to claim 7 which is 2,4-diamino - 5 - (3',4',5' - trimethoxybenzyl) - 6 - methylthiopyrimidine.

19. A compound according to claim 7 which is 2,4-diamino - 5 - (3',5' - diethyl - 4' - hydroxybenzyl) - 6 - methylthiopyrimidine.

20. A compound according to claim 7 which is 2,4-diamino - 5 - (3',5' - diethyl - 4' - methoxybenzyl) - 6-methylthiopyrimidine.

21. A compound according to claim 7 which is 2,4-diamino - 5 - (3',5' - di-t-butyl - 4' - methoxybenzyl)-6-methylthiopyrimidine.

22. A compound according to claim 7 which is 2,4-diamino - 5 - (3',5' - di-t-butyl - 4 - hydroxybenzyl)-6-methylthiopyrimidine.

23. A compound according to claim 7 which is 2,4-diamino - 5 - (3',5' - dimethoxy - 4 - hydroxybenzyl)-6-ethylthiopyrimidine.

24. A compound according to claim 7 which is 2,4-diamino - 5 - (3',4',5' - trimethoxybenzyl) - 6 - ethylthiopyrimidine.

25. A compound according to claim 7 which is 2,4-diamino - 5 - (3',5' - dimethoxy - 4' - hydroxybenzyl)-6-n-butylthiopyrimidine.

26. A compound according to claim 7 which is 2,4-diamino - 5 - (3',4',5' - trimethoxybenzyl) - 6 - n-butylthiopyrimidine.

27. A compound according to claim 1 which is 2,4-diamino - 5 - (3',5' - dimethoxy - 4' - hydroxybenzyl)-6-n-hexylthiopyrimidine.

28. A compound according to claim 1 which is 2,4-diamino - 5 - (3',4',5' - trimethoxybenzyl) - 6 - n-hexylthiopyrimidine.

29. A compound according to claim 7 which is 2,4-diamino - 5 - (3',5' - di-n-propyl - 4 - hydroxybenzyl)-6-methylthiopyrimidine.

30. A compound according to claim 7 which is 2,4-diamino - 5 - (3',5' - di-n-propyl - 4 - methoxybenzyl)-6-methylthiopyrimidine.

31. A compound according to claim 1 which is 2,4 - diamino - 5 - (3',5' - diethyl - 4' - octyloxybenzyl) - 6-methylthiopyrimidine.

32. A compound according to claim 7 which is 2,4-diamino - 5 - (3',5' - diisopropyl - 4' - hydroxybenzyl)-6-methylthiopyrimidine.

33. A compound according to claim 7 which is 2,4-diamino - 5 - (3',5' - diisopropyl - 4' - methoxybenzyl)-6-methylthiopyrimidine.

34. A compound according to claim 1 in which the alkyl group of $R^6$ and $R^{3'}$ contain 1 to 7 carbon atoms.

35. A compound according to claim 34 in which the alkyl group of $R^6$ and $R^{3'}$ contain 1 to 4 carbon atoms.

36. A compound according to claim 5 where $R^{3'}$ is hydrogen.

37. A compound according to claim 5 where $R^{3'}$ is methyl.

38. A compound according to claim 36 where $R^6$ is methyl.

39. A compound according to claim 37 where $R^6$ is methyl.

No references cited.

RICHARD J. GALLAGHER, Primary Examiner

U.S. Cl. X.R.

260—256.4 N, 999

UNITED STATES PATENT OFFICE
CERTIFICATE OF CORRECTION

PATENT NO. : 3,822,264
DATED : JULY 2, 1974
INVENTOR(S) : BARBARA ROTH

It is certified that error appears in the above-identified patent and that said Letters Patent are hereby corrected as shown below:

Column 2, line 9, after "atom and wherein" cancel "$R^3$" and insert -- $R^6$ -- therefor.

Column 4, line 30, "methyl)phenone" should be corrected to read --- methyl)phenol ---.

Column 6, line 26, correct "ehtanol" to read -- ethanol --.

Column 6, line 53, correct "-3-5" to read -3,5- .

Column 7, line 11, correct "(3,5 di-" to read -- 3,5-di- --.

Column 7, line 33, correct "...benzyl)-pyrimidine" to read --- ...benzyl)pyrimidine .

Column 8, line 73, correct "$R^3$" to read -- $R^{3'}$ --.

Column 8, line 36, after "having 1 to 4 carbon atoms," cancel --- "or a benzyl group" ---.

Signed and Sealed this second Day of September 1975

[SEAL]

Attest:

RUTH C. MASON
Attesting Officer

C. MARSHALL DANN
Commissioner of Patents and Trademarks